United States Patent
Li

(10) Patent No.: US 10,784,997 B2
(45) Date of Patent: Sep. 22, 2020

(54) TECHNIQUES OF TRANSMITTING OVERLAPPING UPLINK CHANNELS

(71) Applicant: Mediatek Inc., Hsin-Chu (TW)

(72) Inventor: Xiu-Sheng Li, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 16/253,369

(22) Filed: Jan. 22, 2019

(65) Prior Publication Data

US 2019/0253207 A1 Aug. 15, 2019

Related U.S. Application Data

(60) Provisional application No. 62/629,192, filed on Feb. 12, 2018.

(51) Int. Cl.
| | |
|---|---|
| *H04L 1/18* | (2006.01) |
| *H04W 72/12* | (2009.01) |
| *H04L 5/00* | (2006.01) |
| *H04W 72/04* | (2009.01) |

(Continued)

(52) U.S. Cl.
CPC ............ *H04L 1/1887* (2013.01); *H04L 1/00* (2013.01); *H04L 1/1812* (2013.01); *H04L 5/0053* (2013.01); *H04L 5/0078* (2013.01); *H04L 5/0094* (2013.01); *H04W 24/10* (2013.01); *H04W 72/0413* (2013.01); *H04W 72/0446* (2013.01); *H04W 72/1268* (2013.01)

(58) Field of Classification Search
CPC ....... H04L 1/00; H04L 1/1812; H04L 1/1887; H04L 5/0053; H04L 5/0078; H04L 5/0094; H04W 24/10; H04W 72/0413; H04W 72/0446; H04W 72/1268

See application file for complete search history.

(56) References Cited

U.S. PATENT DOCUMENTS

2007/0149227 A1* 6/2007 Parizhsky ........... H04W 72/042
455/509
2007/0253358 A1* 11/2007 Das ........................ H04L 47/10
370/328

(Continued)

FOREIGN PATENT DOCUMENTS

CN 105850057 A 8/2016

OTHER PUBLICATIONS

International Search Report of PCT/CN2019/073696, dated April 28, 2019.

*Primary Examiner* — Kashif Siddiqui
(74) *Attorney, Agent, or Firm* — Locke Lord LLP; Tim Tingkang Xia, Esq.

(57) ABSTRACT

A method of wireless communication of a UE is provided. The UE receives downlink control information (DCI) in a downlink control channel (DCCH), the DCI indicating a first uplink (UL) channel. The UE determines a second UL channel that has been scheduled prior to receiving the DCI. The UE determines that the first UL channel overlaps with the second UL channel in a time domain. The UE determines whether an earliest symbol period from the first UL channel and the second UL channel is within a predetermined time period from a last symbol period of the DCCH. The UE determines that an unexpected event has occurred or transmits one of the first UL channel and the second UL channel, when the earliest symbol period is within the predetermined time period.

20 Claims, 14 Drawing Sheets

(51) Int. Cl.
*H04W 24/10* (2009.01)
*H04L 1/00* (2006.01)

(56) References Cited

U.S. PATENT DOCUMENTS

| | | | |
|---|---|---|---|
| 2012/0155400 A1* | 6/2012 | Zhang | H04W 74/002 370/329 |
| 2016/0094996 A1 | 3/2016 | Xiong et al. | |
| 2017/0034850 A1 | 2/2017 | Alvarino et al. | |
| 2017/0215198 A1 | 7/2017 | Chen et al. | |
| 2017/0289869 A1 | 10/2017 | Nogami et al. | |
| 2020/0053762 A1* | 2/2020 | Li | H04L 1/1819 |

\* cited by examiner

US 10,784,997 B2

TECHNIQUES OF TRANSMITTING OVERLAPPING UPLINK CHANNELS

CROSS-REFERENCE TO RELATED APPLICATION(S)

This application claims the benefits of U.S. Provisional Application Ser. No. 62/629,192, entitled "DISCUSSION ON PUCCH OVERLAPPING ISSUES" and filed on Feb. 12, 2018, which is expressly incorporated by reference herein in their entirety.

BACKGROUND

Field

The present disclosure relates generally to communication systems, and more particularly, to techniques of transmitting overlapping uplink channels by user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives downlink control information (DCI) in a downlink control channel (DCCH), the DCI indicating a first uplink (UL) channel. The UE determines a second UL channel that has been scheduled prior to receiving the DCI. The UE determines that the first UL channel overlaps with the second UL channel in a time domain. The UE determines whether an earliest symbol period from the first UL channel and the second UL channel is within a predetermined time period from a last symbol period of the DCCH. The UE determines that an unexpected event has occurred or transmits one of the first UL channel and the second UL channel, when the earliest symbol period is within the predetermined time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
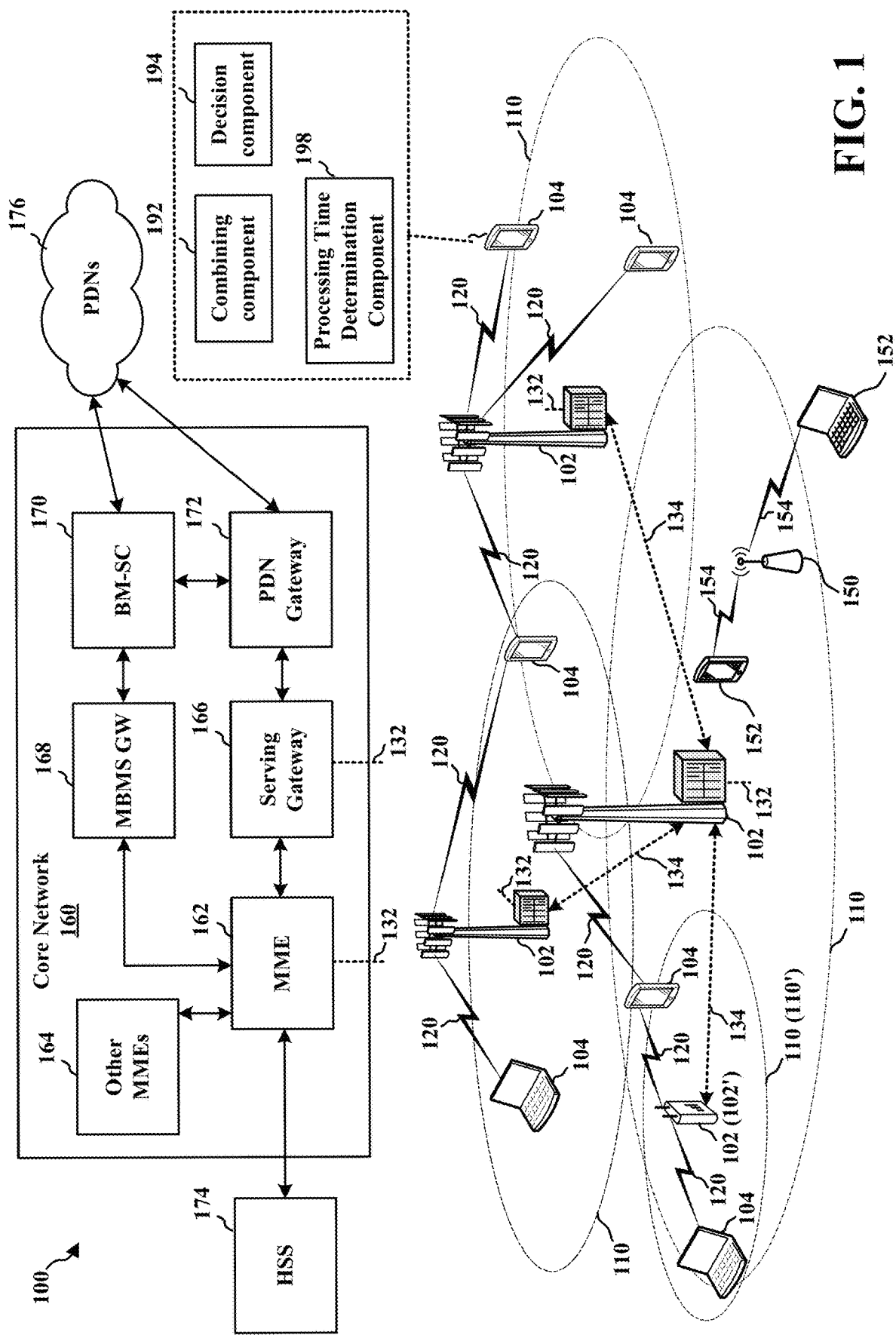
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 1 10. For example, the small cell 102' may have a coverage area 110' that overlaps the coverage area 1 10 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a combining component 192, a decision component 194, and a processing time determination component 198. The UE receives downlink control information (DCI) in a downlink control channel (DCCH), the DCI indicating a first uplink (UL) channel. The UE determines a second UL channel that has been scheduled prior to receiving the DCI. The decision component 194 determines that the first UL channel overlaps with the second UL channel in a time domain. The decision component 194 determines whether an earliest symbol period from the first UL channel and the second UL channel is within a predetermined time period from a last symbol period of the DCCH. The decision component 194 determines that an unexpected event has occurred or the UE transmits one of the first UL channel and the second UL channel, when the earliest symbol period is within the predetermined time period.

Figure 2:
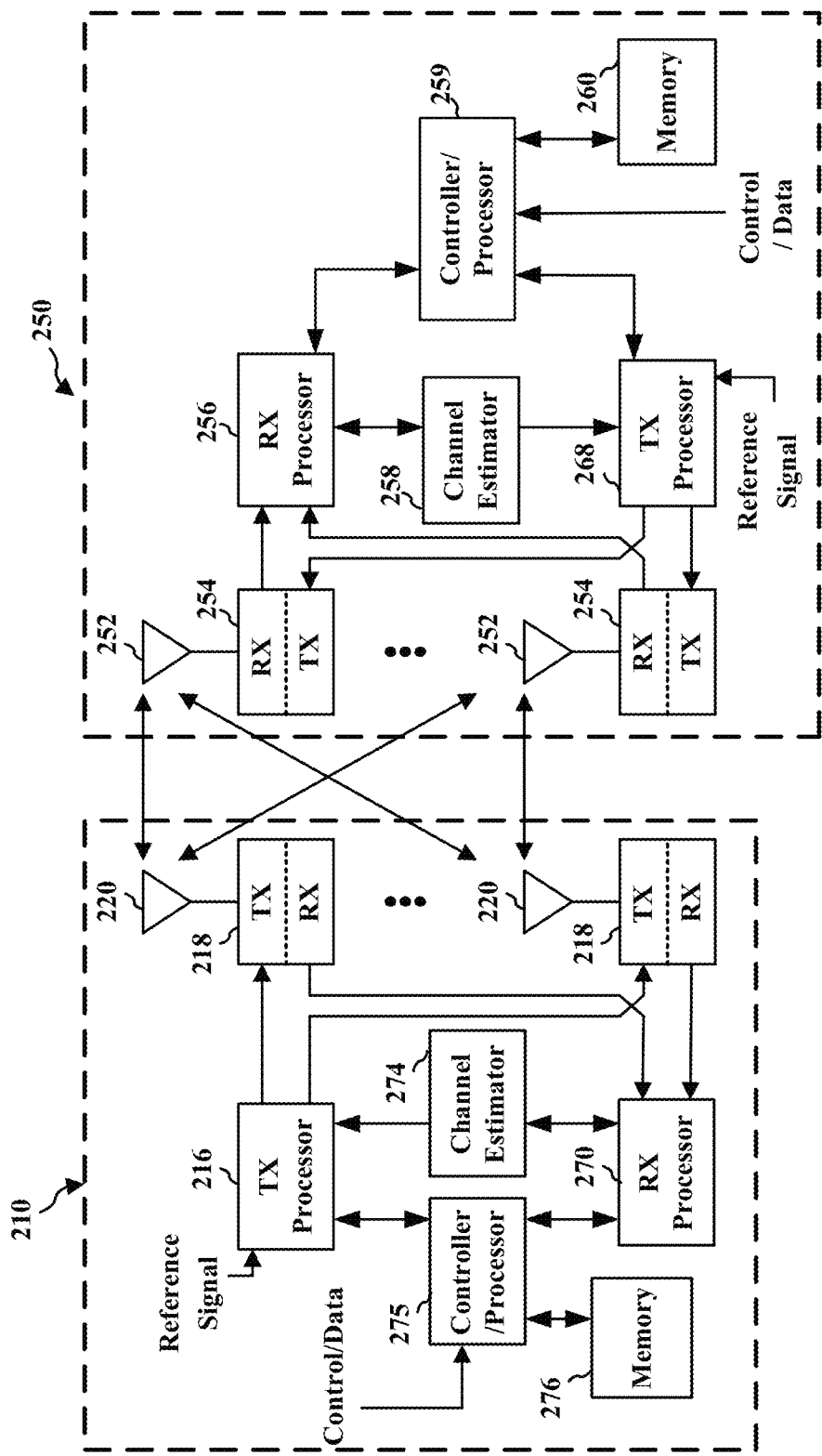
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
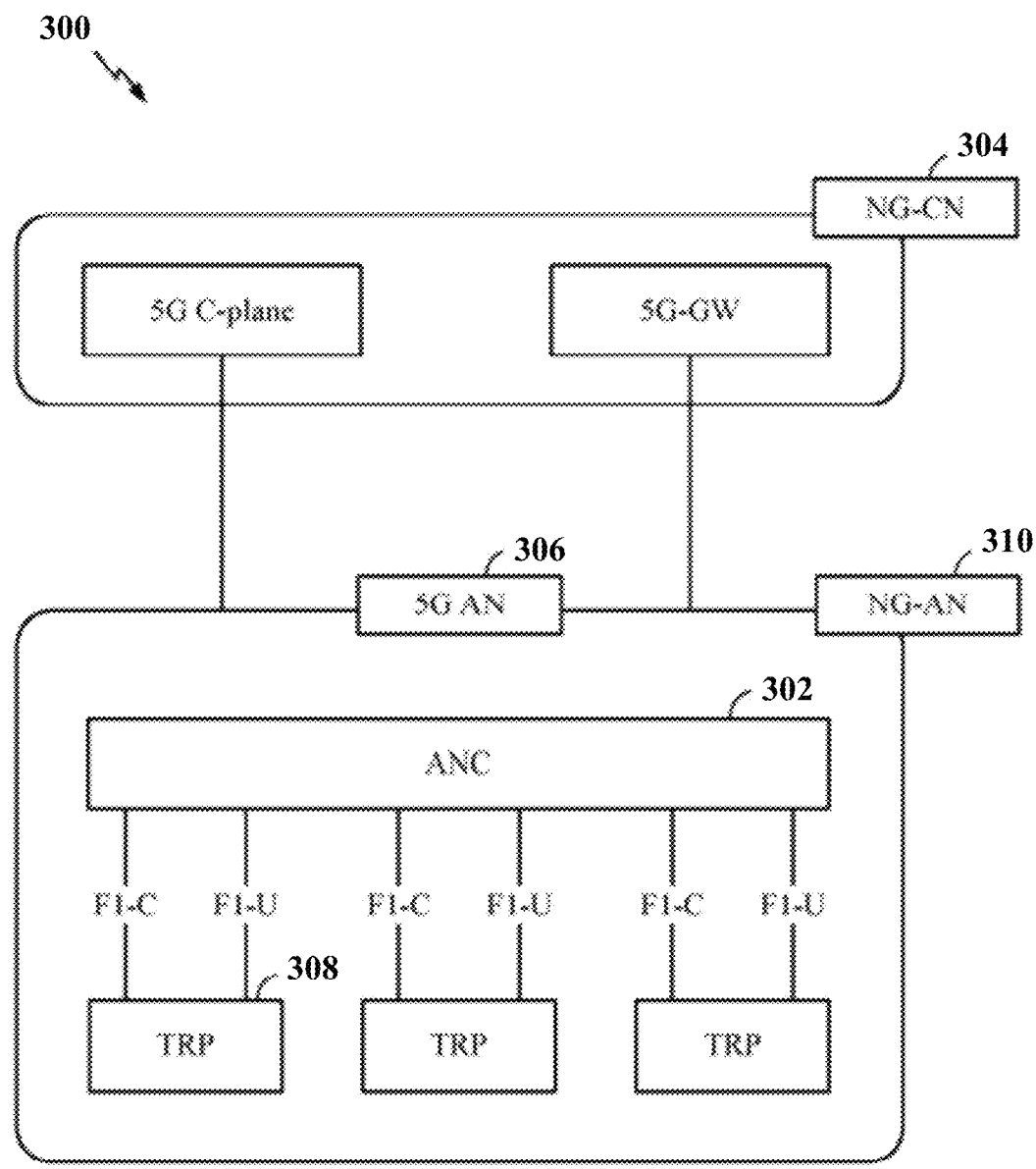
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
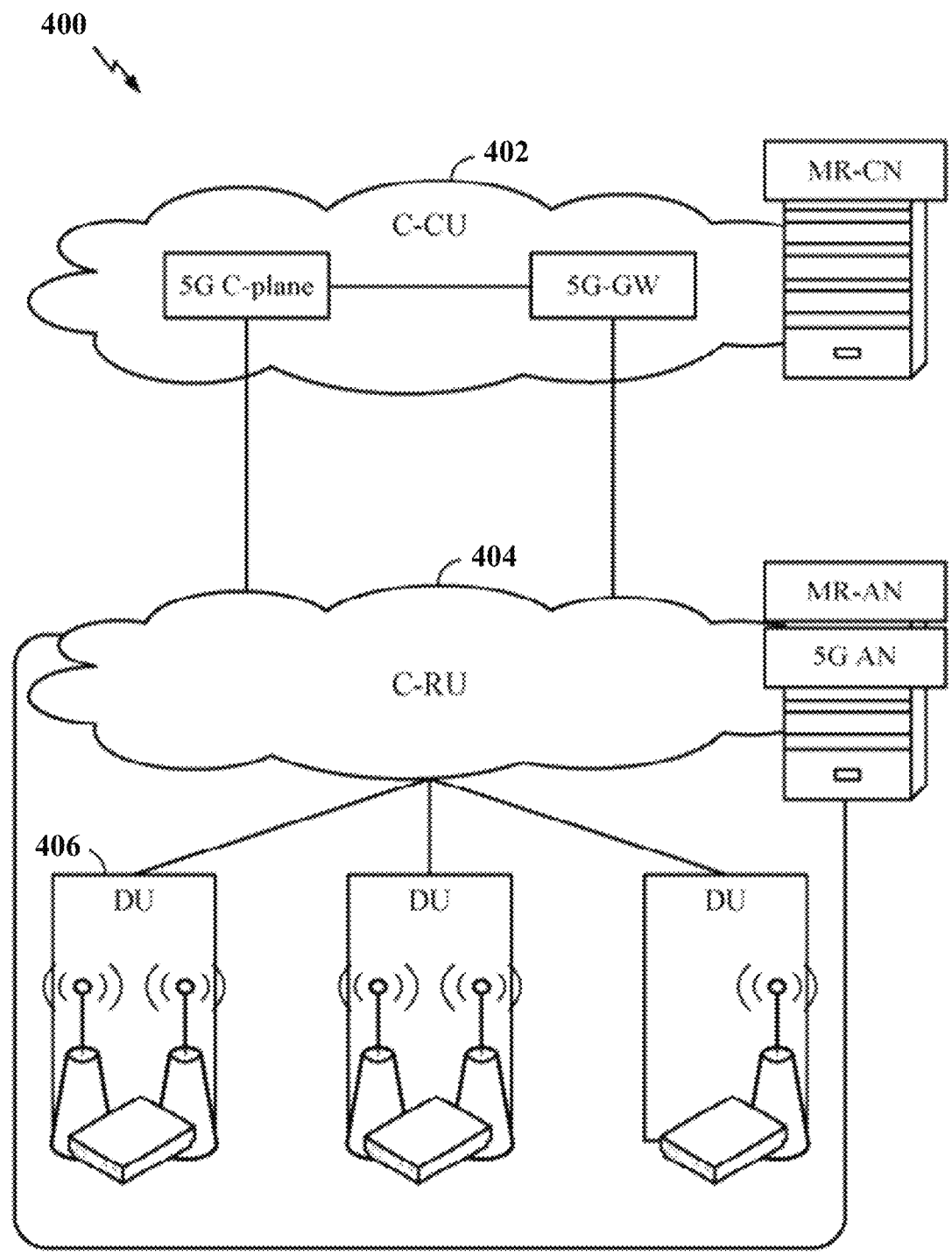
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
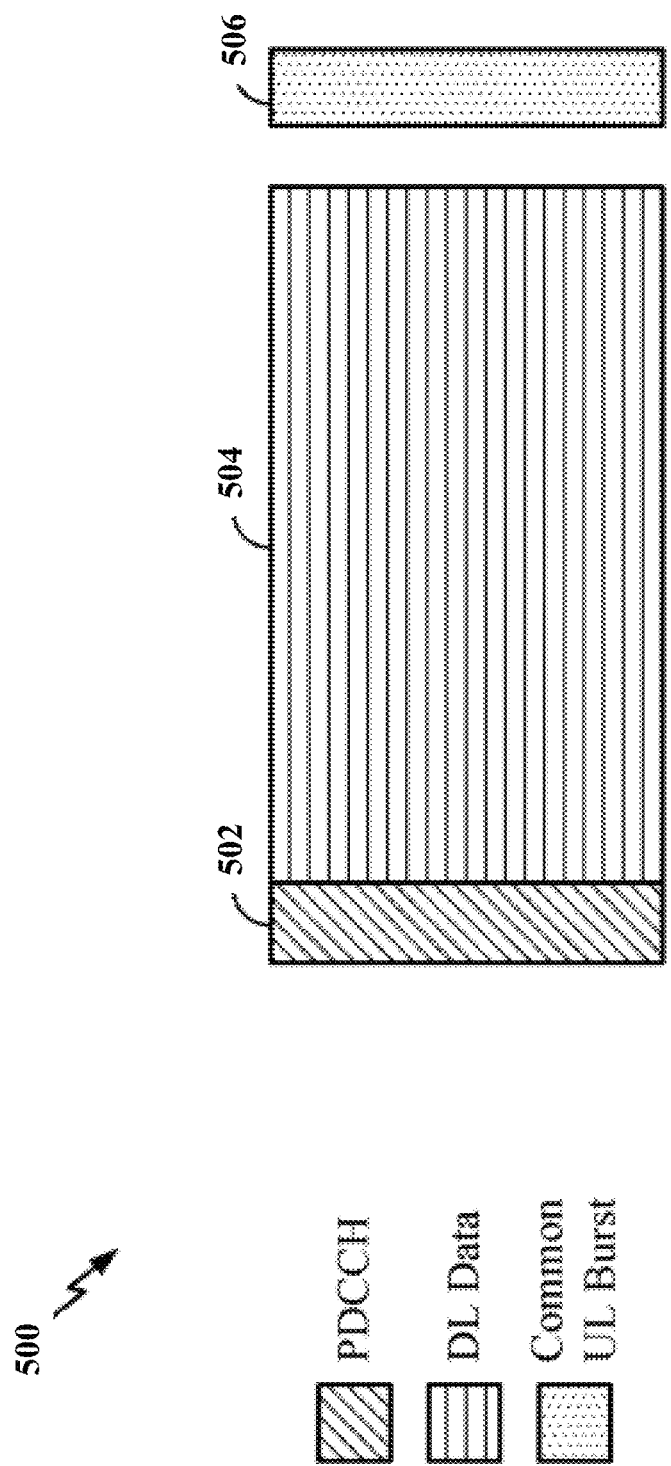
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
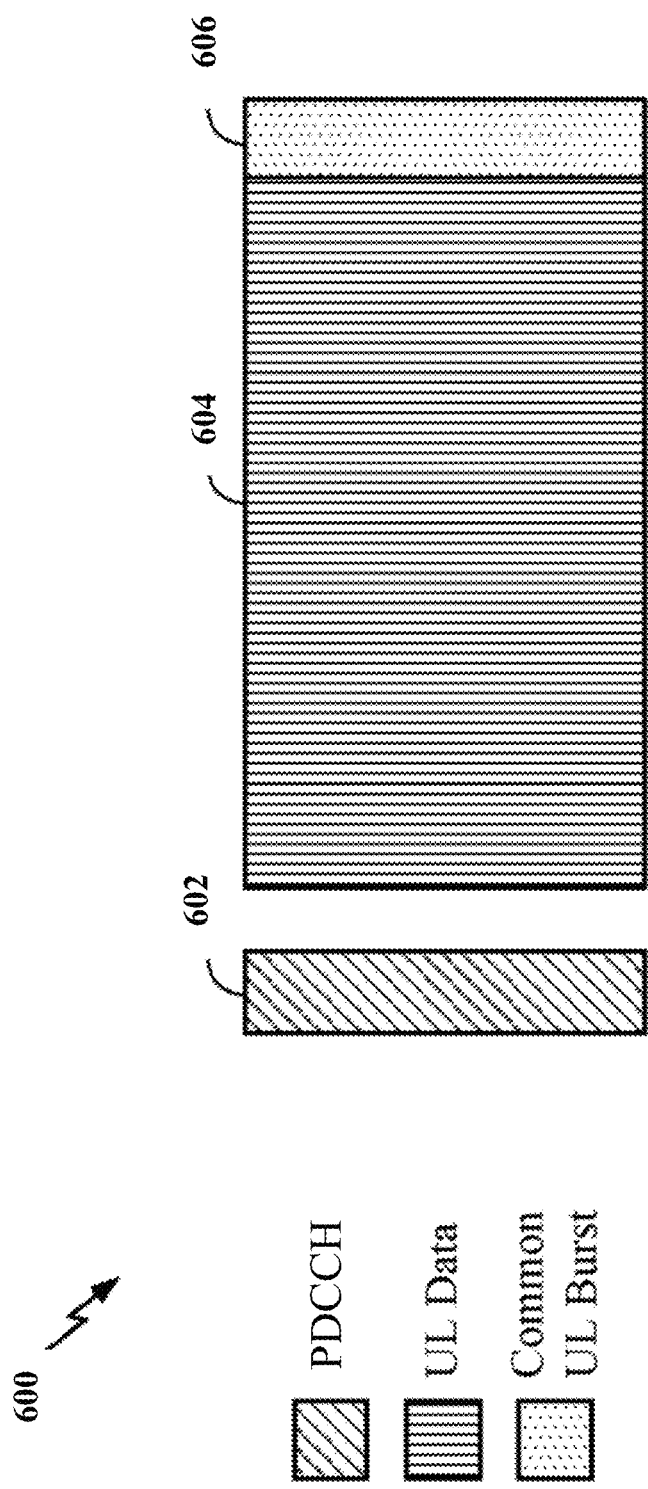
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
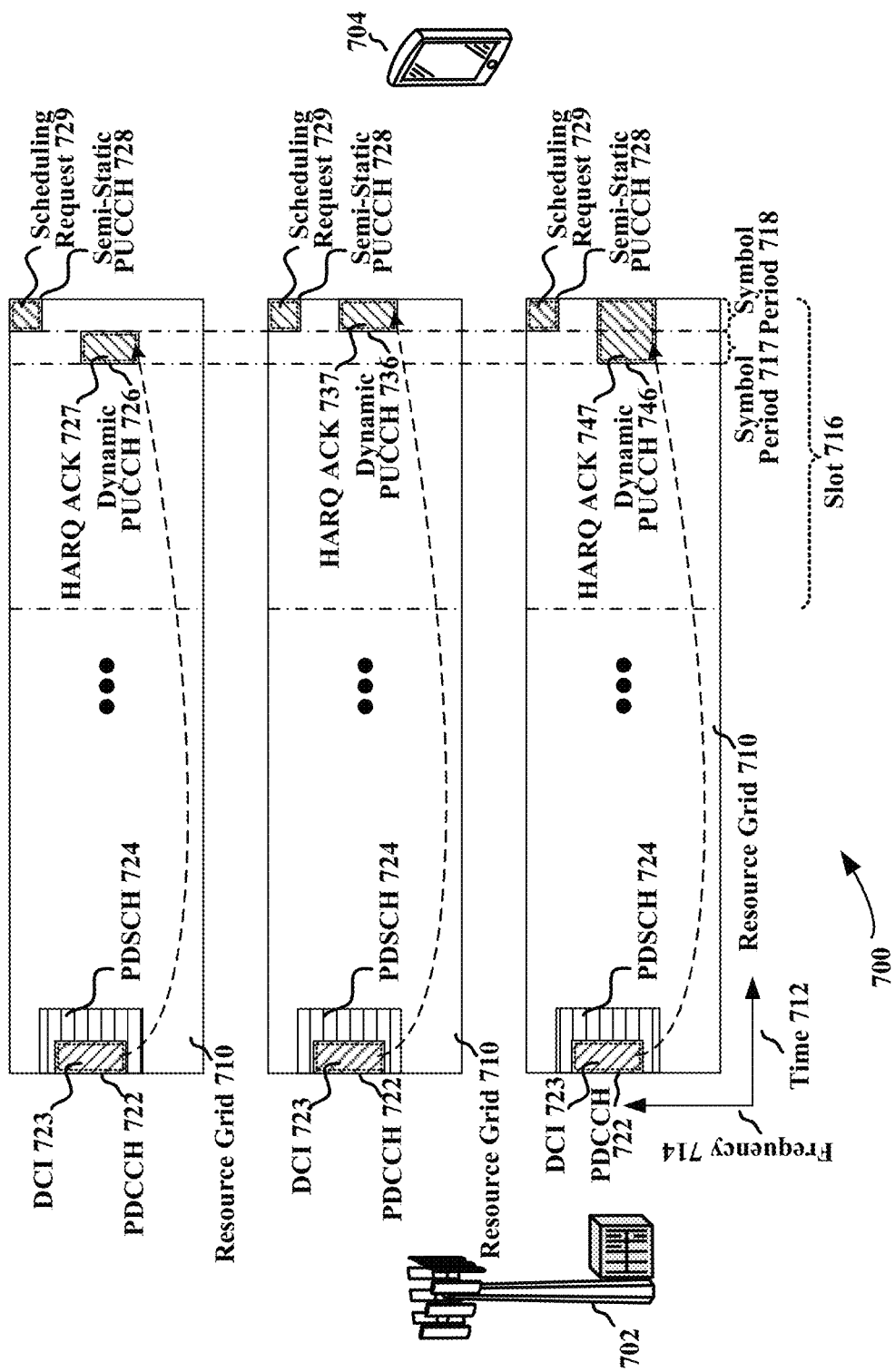
FIG. 7 is a diagram illustrating communications between a UE and a base station.

FIG. 7 is a diagram 700 illustrating communications between a UE 704 and a base station 702. In this example, the base station 702 communicates with the UE 704 on multiple slots 710 including a slot 716 in a time domain 712 and a frequency domain 714. The slot 716 contains multiple symbol periods (e.g., OFDM symbol periods) such as a symbol period 717 and a symbol period 718.

In the three examples shown, the base station 702 may transmit downlink control information (DCI) 723 in a PDCCH 722 and transmit downlink data in a PDSCH 724. The DCI 723 may indicate dynamically to the UE 704 a PUCCH (e.g., a dynamic PUCCH 726, a dynamic PUCCH 736 or a dynamic PUCCH 746 in different examples) for the UE 704 to transmit a hybrid automatic repeat request (HARQ) acknowledge (ACK) (e.g., a HARQ ACK 727, a HARQ ACK 737 or a HARQ ACK 747). In particular, the UE 704 may decode the DCI 723 to determine resources of a dynamic PUCCH assigned to the UE 704 (e.g., the dynamic PUCCH 726, the dynamic PUCCH 736 or the dynamic PUCCH 746). The assigned PUCCH may occupy one or more symbol periods. For example, the dynamic PUCCH 726 occupies one symbol period 717, the dynamic PUCCH 736 occupies one symbol period 718, and the dynamic PUCCH 746 occupies two symbol periods 717, 718.

Moreover, the UE 704 may transmit uplink control information (UCI) other than HARQ ACK such as a scheduling request or a channel state information (CSI) report to the base station 702 on a semi-static (or semi persistent) PUCCH in the same slot as that containing the dynamic PUCCH. In this example, the UE 704 may transmit a scheduling request 729 to the base station 702 on a semi-static PUCCH 728 in the slot 716; the semi-static PUCCH 728 may occupy one symbol period 718.

In a first example, the DCI 723 may indicate the dynamic PUCCH 726 for transmitting the HARQ ACK 727 and that does not overlap with the semi-static PUCCH 728. In certain configurations, the UE 704 may transmit the HARQ ACK 727 on the dynamic PUCCH 726 and the scheduling request 729 on the semi-static PUCCH 728, separately.

In a second example, the DCI 723 may indicate the dynamic PUCCH 736 for transmitting the HARQ ACK 737. In this example, the semi-static PUCCH 728 and the dynamic PUCCH 736 completely overlap with each other. In certain configurations, the UE 704 may accordingly combine the dynamic PUCCH 736 and the semi-static PUCCH 728 into one single combined PUCCH. Further, the UE 704 may combine the information bits of the HARQ ACK 737 and the information bits of the scheduling request 729 into combined information bits. The UE 704 may subsequently transmit the combined information bits to the base station 702 on the combined PUCCH. For example, the UE 704 may append information bit(s) of the scheduling request 729 to the end of the information bits of the HARQ ACK 737 to form combined information bits.

In a third example, the DCI 723 may indicate the dynamic PUCCH 746 for transmitting the HARQ ACK 747. In this example, the semi-static PUCCH 728 and the dynamic PUCCH 746 partially overlap with each other. More specifically, the semi-static PUCCH 728 and the dynamic PUCCH 746 both occupy the symbol period 718, and the dynamic PUCCH 746 occupies another symbol period 717 that is not occupied by the semi-static PUCCH 728. As described infra, the UE 704 may employ certain techniques to handle such PUCCH partial overlapping situations.

In general, a UE has a limited processing capability, and it may take the UE a certain amount of time to decode a DCI carried in a PDCCH. Thus, it may be the case that while the UE is still decoding the DCI carried in the PDCCH to determine resources of a dynamic PUCCH in a particular slot, the UE has already begun to transmit UCI information bits on a semi-static PUCCH in the same particular slot. Therefore, it is challenging to combine information bits (e.g., information bits of a HARQ ACK) carried in the dynamic PUCCH and the UCI information bits (e.g., information bits of a scheduling request or a CSI report) carried in the semi-static PUCCH.

Figure 8:
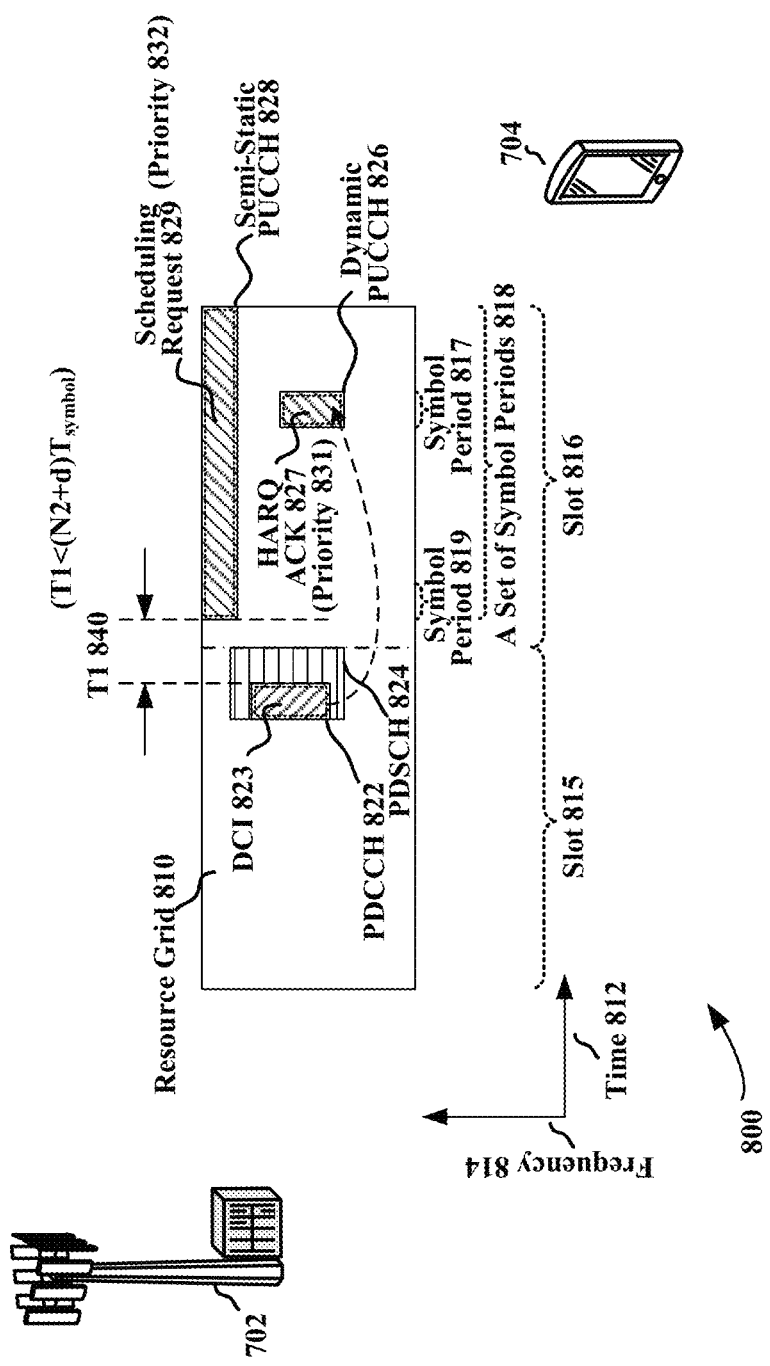
FIG. 8 is a diagram illustrating techniques of handling partially overlapped PUCCHs.

FIG. 8 is a diagram 800 illustrating techniques of handling partially overlapped PUCCHs. In this example, the base station 702 may transmit DCI 823 on a PDCCH 822 and downlink data on a PDSCH 824 in a slot 815. The DCI 823 may indicate a dynamic PUCCH 826 in a slot 816 for the UE 704 to transmit a HARQ ACK 827 with a priority 831. In particular, the UE 704 may decode the DCI 823 to determine resources of the dynamic PUCCH 826 in the slot 816 assigned to the UE 704. The slot 816 may or may not be the next slot subsequent to the slot 815. In this example, the dynamic PUCCH 826 occupies only one symbol period 817. Moreover, the UE 704 may transmit a scheduling request 829 with a priority 832 to the base station 702 on a semi-static PUCCH 828 in the same slot 816. The semi-static PUCCH 828 may occupy a set of symbol periods 818. An initial symbol period of the set of symbol periods 818 is a symbol period 819. The semi-static PUCCH 828 and the dynamic PUCCH 826 partially overlap with each other. More specifically, the semi-static PUCCH 828 and the dynamic PUCCH 826 both occupies the symbol period 817, and the semi-static PUCCH 828 occupies at least one symbol periods (e.g., the symbol period 819) that is not occupied by the dynamic PUCCH 826.

The UE 704 may determine a gap T1 840 that is between the last symbol period of the PDCCH 822 and a reference symbol period, which is described infra. When the UE 704 determines that the gap T1 840 is equal to or greater than a threshold, the UE 704 may determine resources of a combined PUCCH, which may or may not occupy the resources of the dynamic PUCCH 826 and the semi-static PUCCH 828. The UE 704 combines the information bits to be carried in the PUCCHs 826, 828 into combined information bits and subsequently transmit the combined information bits on the combined PUCCH. When the UE 704 determines that the gap T1 840 is smaller than the threshold, the UE 704 may not combine the information bits to be carried in the PUCCHs 826, 828.

In certain configurations, the UE 704 selects an initial symbol period (e.g., the symbol period 819) of the semi-static PUCCH (e.g., the semi-static PUCCH 828) to be the reference symbol period. In other configurations, the UE 704 selects an initial symbol period (e.g., the symbol period 819) of the earlier PUCCH of the dynamic PUCCH (e.g., the dynamic PUCCH 826) and the semi-static PUCCH (e.g., the semi-static PUCCH 828) to be the reference symbol period.

In other words, if an initial symbol period (e.g., the symbol period 817) of the dynamic PUCCH (e.g., the dynamic PUCCH 826) is earlier than an initial symbol period (e.g., the symbol period 819) of the semi-static PUCCH (e.g., the semi-static PUCCH 828), the reference symbol period is the initial symbol period (e.g., the symbol period 817) of the dynamic PUCCH (e.g., the dynamic PUCCH 826); otherwise, the reference symbol period is the initial symbol period (e.g., the symbol period 819) of the semi-static PUCCH (e.g., the semi-static PUCCH 828).

In this example of FIG. 8, the UE 704 selects the initial symbol period 819 of the semi-static PUCCH 828 to be the reference symbol period. Thus, the gap T1 840 is between the last symbol period of the PDCCH 822 and the reference symbol period 819.

In certain configurations, the UE 704 may determine the threshold described supra as $(N2+d)T_{symbol}$, where $T_{symbol}$ is a time duration of a symbol period, d is an integer greater than or equal to 0, and N2 is a processing time defined for the UE 704 to decode a PDCCH and to prepare a PUSCH. In one example, d is 1. In another example, d is 2.

More specifically, in one example, N2 is based on μ for UE processing capability 1 and 2 respectively, where μ corresponds to the one of $(\mu_{DL}, \mu_{UL})$ resulting with the largest $T_{proc,2}$, where the $\mu_{DL}$ corresponds to a subcarrier spacing (SCS) of a downlink with which a PDCCH carrying a DCI scheduling a PUSCH was transmitted, and $\mu_{UL}$ corresponds to a subcarrier spacing of an uplink channel with which a PUSCH is to be transmitted. $T_{proc,2}$=max$((N_2+d_{2,1})(2048+144)\cdot\kappa 2^{-\mu}\cdot T_c, d_{2,2})$, where $d_{2,1}$ and $d_{2,2}$ are integers equal to or greater than 0, $T_c$ is a time unit, and κ is a constant. In particular, $T_c=1/(\Delta f_{max}\cdot N_f)$ where $\Delta f_{max}=480\cdot 10^3$ Hz and $N_f=4096$. In particular, the constant $\kappa=T_s/T_c=64$, where $T_s=1/(\Delta f_{ref}\cdot N_{f,ref})$, $\Delta f_{ref}=15\cdot 10^3$ Hz and $N_{f,ref}=2048$. For PUSCH timing capability 1, N2 is 10, 12, 23 and 36 when μ is 0, 1, 2 and 3, respectively. For PUSCH timing capability 2, N2 is 5, 5.5 and 11 (for frequency range 1) when μ is 0, 1 and 2, respectively.

In other configurations, the threshold may be other function of N2. In yet other configurations, the threshold may be a fixed value for each given subcarrier spacing (SCS).

In this example, a threshold is $(N2+d)T_{symbol}$, and the gap T1 840 is smaller than the threshold $(N2+d)T_{symbol}$. In a first configuration, the UE 704 may determine that an unexpected event has occurred when the gap T1 840 is smaller than the threshold $(N2+d)T_{symbol}$.

In a second configuration, the UE 704 may transmit the information bits carried in the PUCCH (either the dynamic PUCCH 826 or the semi-static PUCCH 828) that starts earlier in time. In this example, the UE 704 determines to transmit the scheduling request 829 on the semi-static PUCCH 828, as the symbol period 819 (which is the initial symbol period of the PUCCH 828) is earlier than the symbol period 817 (which is the initial symbol period of the PUCCH 826).

In the second configuration, if the dynamic PUCCH 826 and the semi-static PUCCH 828 start in the same symbol period in the slot, the UE 704 may transmit information bits of UCI with a higher priority. One example of priority rule may be: a priority of a HARQ ACK (e.g., a HARQ ACK 827) is higher than that of a scheduling request (e.g., a scheduling request 829), and a priority of a scheduling request (e.g., a scheduling request 829) is higher than that of a CSI report.

In a third configuration, the UE 704 may transmit the information bits carried on one of the dynamic PUCCH 826 and the semi-static PUCCH 828 based solely on a priority rule (i.e., which PUCCH starts earlier is irrelevant). One example of priority rule may be: a priority of a HARQ ACK (e.g., a HARQ ACK 827) is higher than that of a scheduling request (e.g., a scheduling request 829), and a priority of a scheduling request (e.g., a scheduling request 829) is higher than that of a CSI reporting. In one example, the UE 704 determines to transmit the HARQ ACK 827 on the dynamic PUCCH 826, as the priority 831 of the HARQ ACK 827 is higher than the priority 832 of the scheduling request 829.

In other configurations, the UE 704 may transmit the information bits carried in one of the dynamic PUCCH 826 and the semi-static PUCCH 828 based on other UCI priority rule.

Figure 9:
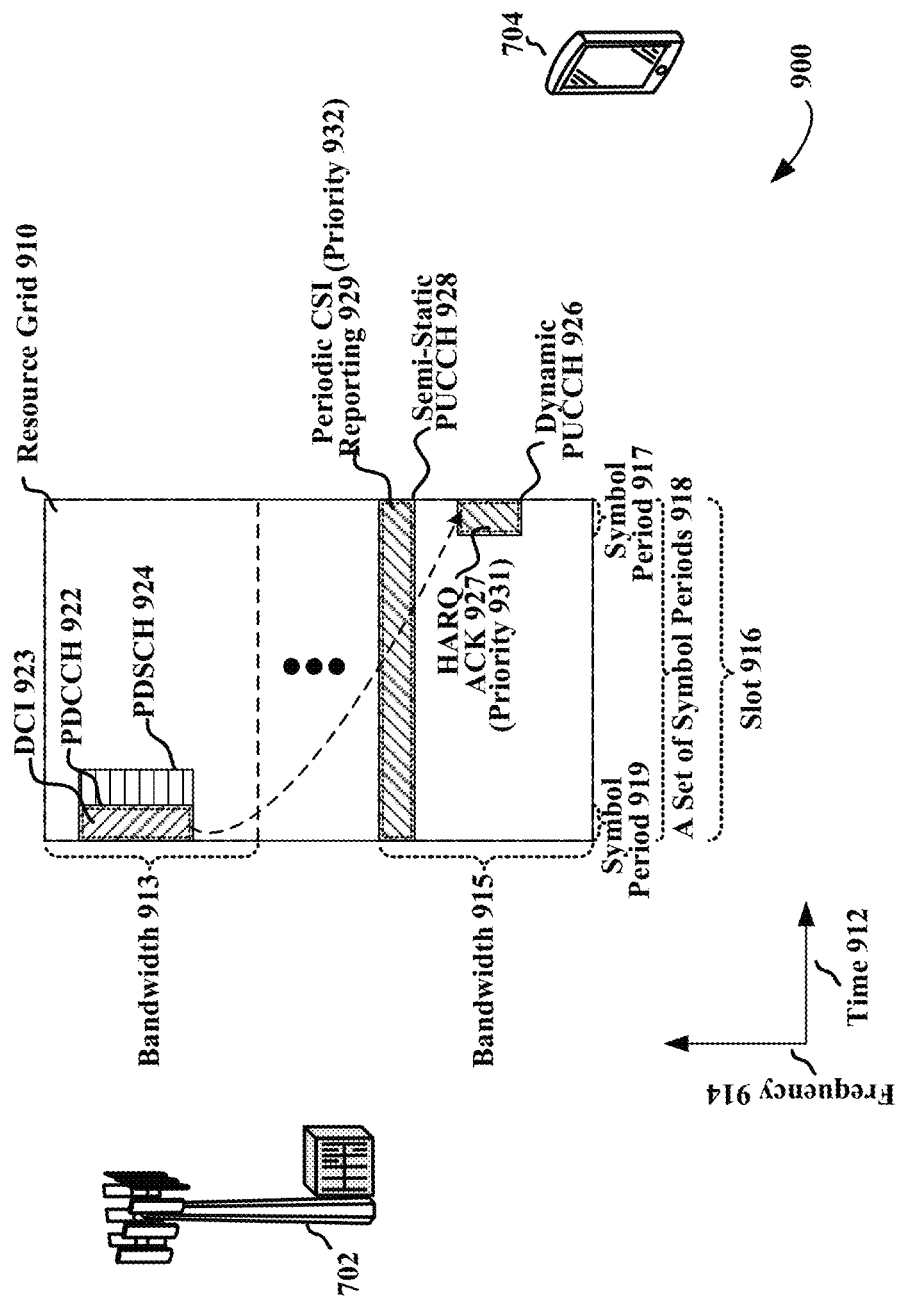
FIG. 9 is another diagram illustrating techniques of handling partially overlapped PUCCHs.

FIG. 9 is another diagram 900 illustrating techniques of handling partially overlapped PUCCHs. Similar to the example shown in FIG. 8, in this example, the base station 702 may transmit DCI 923 in a PDCCH 922 and transmit downlink data in a PDSCH 924 in a bandwidth 913 and in a slot 916. The DCI 923 may indicate a dynamic PUCCH 926 for the UE 704 to transmit a HARQ ACK 927 with a priority 931 in a bandwidth 915 and in the slot 916. In particular, the UE 704 may decode the DCI 923 to determine resources of the dynamic PUCCH 926 assigned to the UE 704. In this example, the PDCCH 922 and the dynamic PUCCH 926 are in the same slot 916 but in different bandwidth: the PDCCH 922 is in the downlink bandwidth 913 while the dynamic PUCCH 926 is in the uplink bandwidth 915. The assigned dynamic PUCCH 926 occupies only one symbol period 917. Moreover, the UE 704 may transmit a periodic CSI reporting 929 with a priority 932 to the base station 702 on a semi-static PUCCH 928 in the same slot 916. The semi-static PUCCH 928 may occupy a set of symbol periods 918. An initial symbol period of the set of symbol periods 918 is the symbol period 919. The semi-static PUCCH 928 and the dynamic PUCCH 926 partially overlaps with each other. In particular, the semi-static PUCCH 928 and the dynamic PUCCH 926 both occupy the symbol period 917, and the semi-static PUCCH 928 occupies at least one symbol periods (e.g., the symbol period 919) that is not occupied by the dynamic PUCCH 926.

In this example, the UE 702 selects the initial symbol period 919 of the semi-static PUCCH 928 to be the reference symbol period. Thus, the gap between the last symbol period of the PDCCH 922 and the reference symbol period 919 is smaller than the threshold described supra.

In a first configuration, the UE 704 may determine that an unexpected event has occurred when the gap is smaller than the threshold $(N2+d)T_{symbol}$. In a second configuration, the UE 704 may transmit the periodic CSI reporting 929 on the semi-static PUCCH 928, as the symbol period 919 is earlier than the symbol period 917. In a third configuration, the UE may transmit the HARQ ACK 927 on the dynamic PUCCH 926, as the priority 931 of the HARQ ACK 927 is higher than the priority 932 of the periodic CSI reporting 929. In other configurations, the UE 704 may treat this situation as an error case (e.g., an unexpected event).

Figure 10:
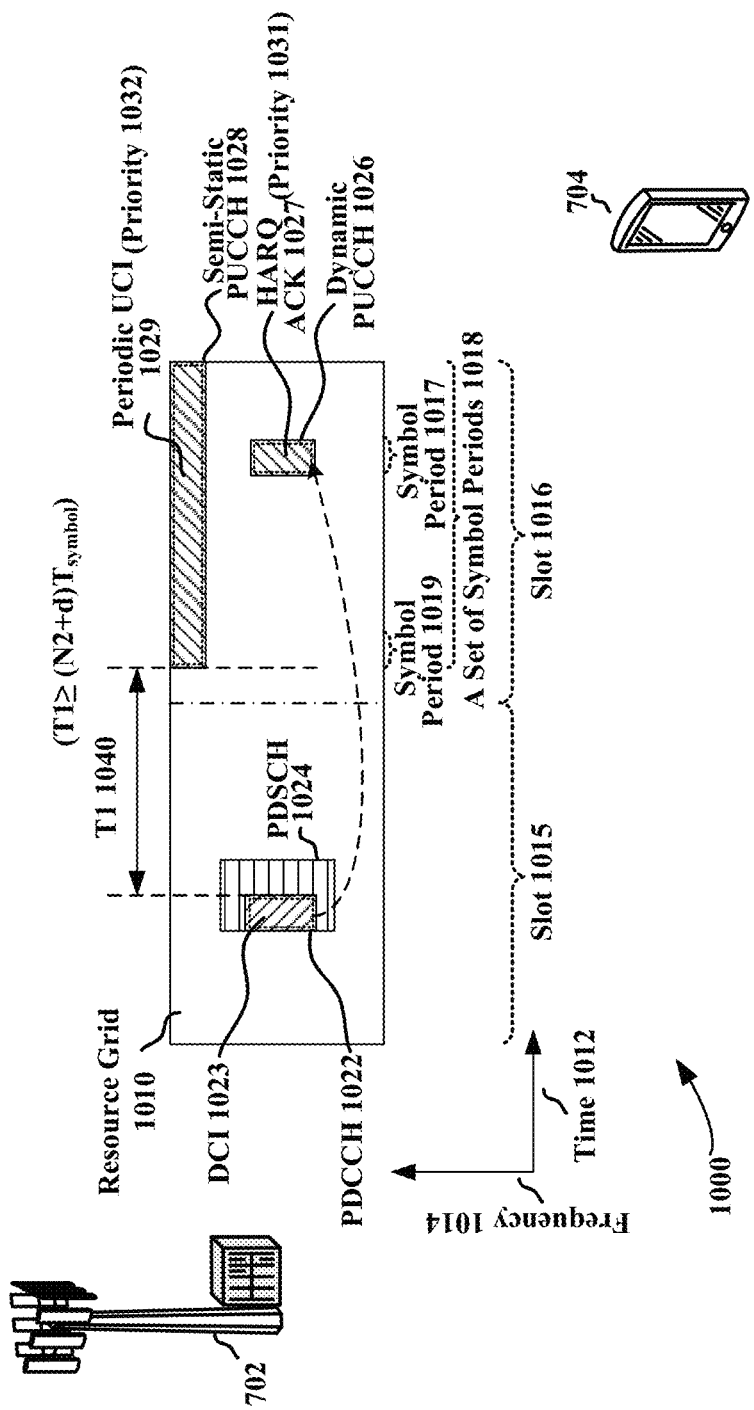
FIG. 10 is yet another diagram illustrating techniques of handling partially overlapped PUCCHs.

FIG. 10 is a diagram 1000 illustrating techniques of handling partially overlapped PUCCHs. In this example, the base station 702 may transmit DCI 1023 on a PDCCH 1022 and transmit downlink data on a PDSCH 1024 in a slot 1015. The DCI 1023 may indicate a dynamic PUCCH 1026 in a slot 1016 for the UE 704 to transmit a HARQ ACK 1027 with a priority 1031. In particular, the UE 704 may decode the DCI 1023 to determine resources of the dynamic PUCCH 1026 assigned to the UE 704. The slot 1016 may or may not be the next slot subsequent to the slot 1015. In this example, the assigned dynamic PUCCH 1026 occupies only one symbol period 1017. Moreover, the UE 704 may transmit a periodic UCI (e.g., a periodic CSI reporting) 1029 with a priority 1032 to the base station 702 on a semi-static PUCCH 1028 in the same slot 1016. The semi-static PUCCH 1028 may occupy a set of symbol periods 1018. An initial symbol period of the set of symbol periods 1018 is a symbol period 1019. The semi-static PUCCH 1028 and the dynamic PUCCH 1026 partially overlap with each other. More specifically, the semi-static PUCCH 1028 and the dynamic PUCCH 1026 both occupies the symbol period 1017, and the semi-static PUCCH 1028 occupies at least one symbol periods (e.g., the symbol period 1019) that is not occupied by the dynamic PUCCH 1026.

In this example, the UE 704 selects the reference symbol period to be the initial symbol period 1019 of the semi-static PUCCH 1028. Thus, the gap T1 1040 is between the last symbol period of the PDCCH 1022 and the reference symbol period 1019. In this example, a threshold is $(N2+d)T_{symbol}$, and the gap T1 1040 is equal to or greater than the threshold $(N2+d)T_{symbol}$.

Accordingly, when the information bits of the HARQ ACK 1027 to be carried in the dynamic PUCCH 1026 and the information bits of the periodic UCI 1029 to be carried in the semi-static PUCCH 1028 are allowed to be combined, the UE 704 may combine them to obtain combined information bits. Further, the UE 704 may determine resources of a combined PUCCH, which may or may not occupy the resources of the dynamic PUCCH 1026 and the semi-static PUCCH 1028. The UE 704 subsequently transmits the combined information bits to the base station 702 on the combined PUCCH. However, if the information bits carried in the dynamic PUCCH 1026 and the information bits carried in the semi-static PUCCH 1028 are not allowed to be combined, the UE 704 may follow existing dropping rule to transmit either the dynamic PUCCH 1026 or the semi-static PUCCH 1028.

Figure 11:
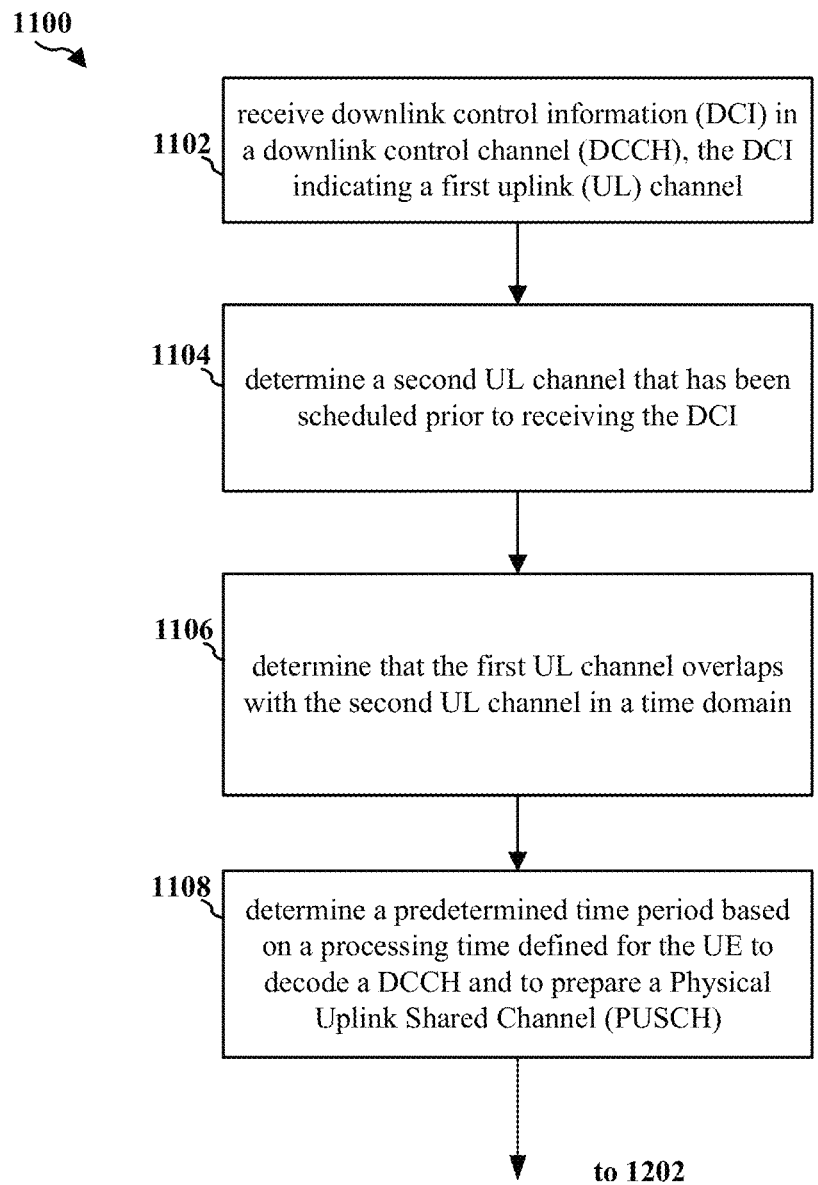
FIG. 11 is a flow chart illustrating a method (process) of handling partially overlapped PUCCHs.

FIG. 11 is a flow chart 1100 illustrating a method (process) of handling partially overlapped PUCCHs. The method may be performed by a UE (e.g., the UE 704, the apparatus 1302/1302'). At operation 1102, the UE 704 receives DCI (e.g., the DCI 1023) in a downlink control channel (DCCH) (e.g., the PDCCH 1022), the DCI indicating a first uplink (UL) channel (e.g., the dynamic PUCCH 1026). At operation 1104, the UE 704 determines a second UL channel (e.g., the semi-static PUCCH 1028) that has been scheduled prior to receiving the DCI. In some configurations, the scheduling of the second UL channel is semi-static or semi-persistent. In some configurations, each of the first UL channel and the second UL channel is a PUCCH or a PUSCH. In some configurations, the first UL channel is a PUCCH (e.g., the dynamic PUCCH 1026), wherein the second UL channel is another PUCCH (e.g., the semi-static PUCCH 1028). In some configurations, the first UL channel is for carrying a HARQ ACK (e.g., the HARQ ACK 1027). In some configurations, the second UL channel is for carrying a CSI report (e.g., the periodic CSI reporting 929) or a scheduling request (SR) (e.g., the scheduling request 829). In some configurations, at least one symbol period (e.g., the symbol period 1019) is in one of the first UL channel and the second UL channel and is not in the other one of the first UL channel and the second UL channel.

At operation 1106, the UE 704 determines that the first UL channel overlaps with the second UL channel in a time domain (e.g., the time domain 1012). At operation 1108, the UE 704 determines a predetermined time period (e.g., $(N2) \times T_{symbol}$) based on a processing time defined for the UE to decode a DCCH and to prepare a Physical Uplink Shared Channel (PUSCH). In some configurations, the predetermined time period (e.g., $(N2+d)T_{symbol}$) is the processing time and a fixed number of additional symbol periods. Operation 1108 is followed by operation 1202 in FIG. 12.

Figure 12:
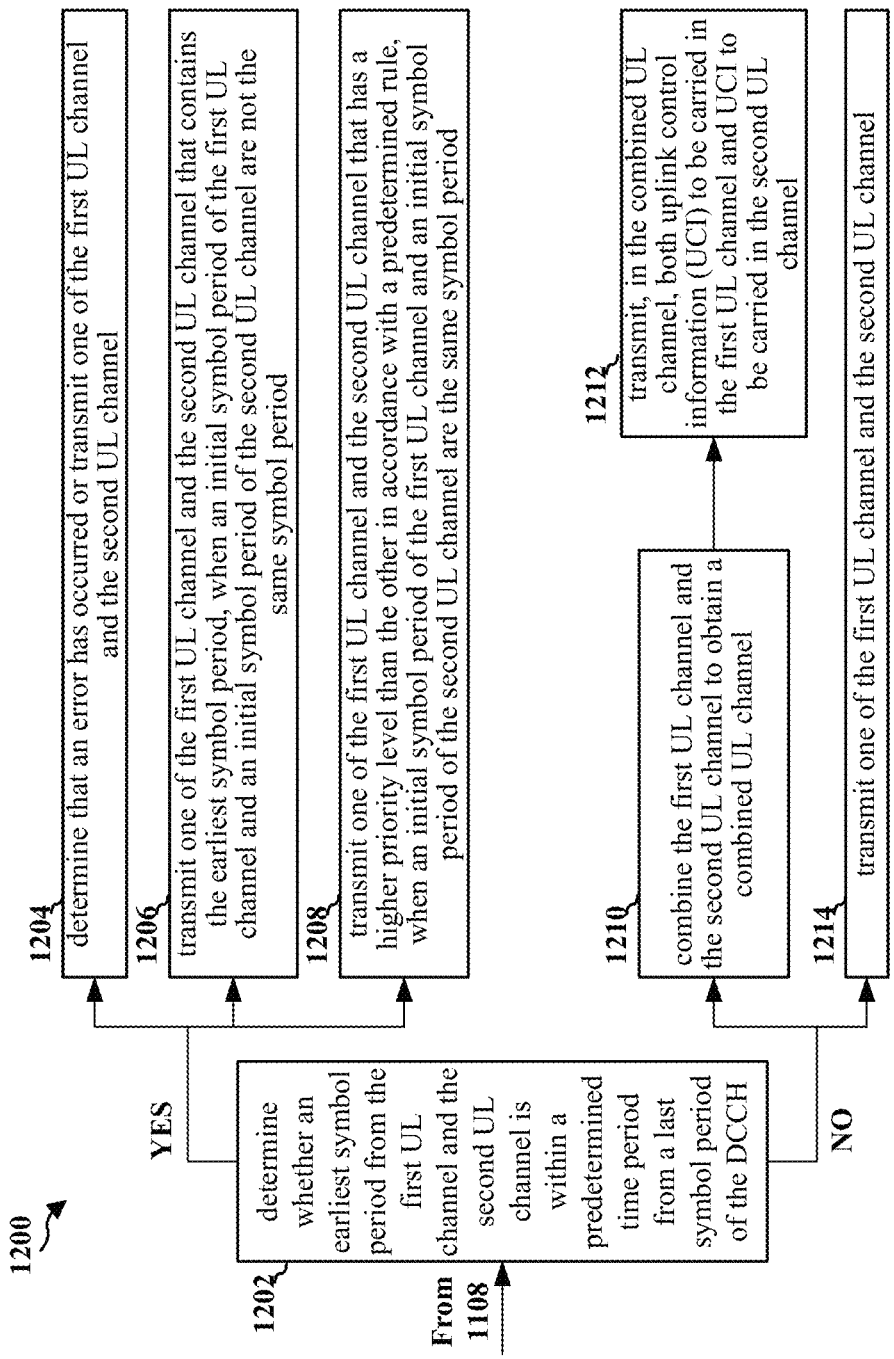
FIG. 12 is a flow chart illustrating a method (process) of handling partially overlapped PUCCHs.

FIG. 12 is a flow chart 1200 illustrating a method (process) of handling partially overlapped PUCCHs. The method may be performed by a UE (e.g., the UE 704, the apparatus 1302/1302'). At operation 1202, the UE 704 determines whether an earliest symbol period (e.g., the symbol period 1019) from the first UL channel and the second UL channel is within a predetermined time period (e.g., $(N2+d)T_{symbol}$) from a last symbol period of the DCCH.

When the earliest symbol period is within the predetermined time period, at operation 1204, the UE 704 determines that an unexpected event has occurred or transmit one of the first UL channel and the second UL channel. Alternatively, at operation 1206 the UE 704 transmits one of the first UL channel and the second UL channel that contains the earliest symbol period (e.g., the symbol period 1019), when an initial symbol period (e.g., the symbol period 1017) of the first UL channel and an initial symbol period (e.g., the symbol period 1019) of the second UL channel are not the same symbol period. Alternatively, at operation 1208, the UE 704 transmits one of the first UL channel and the second UL channel that has a higher priority level (e.g., the priority 1031 or the priority 1032) than the other in accordance with a predetermined rule, when an initial symbol period (e.g., the symbol period 1017) of the first UL channel and an initial symbol period (e.g., the symbol period 1017) of the second UL channel are the same symbol period.

In some configurations, the predetermined rule defines (a) that a UL channel carrying a HARQ ACK (e.g., the HARQ ACK 1027) has a priority level (e.g., the priority 1031) higher than that (e.g., the priority 832) of a UL channel carrying a scheduling request (e.g., the scheduling request 829) and (b) that a UL channel carrying a scheduling request (e.g., the scheduling request 829) has a priority level (e.g., the priority 832) higher than that (e.g., the priority 932) of a UL channel carrying channel state information (CSI) (e.g., the periodic CSI reporting 929). In some configurations, one of the first UL channel and the second UL channel that has a higher priority than the other in accordance with a predetermined rule is transmitted, when the earliest symbol period is within the predetermined time period. The predetermined rule defines (a) that a UL channel carrying a HARQ ACK has a priority level higher than that of a UL channel carrying a scheduling request (SR) and (b) that a UL channel carrying a SR has a priority level higher than that of a UL channel carrying channel state information (CSI).

On the other hand, when the earliest symbol period is not within the predetermined time period, at operation 1210, the UE 704 combines the first UL channel (e.g., the dynamic PUCCH 1026) and the second UL channel (e.g., the semi-static PUCCH 1028) to obtain a combined UL channel. At operation 1212, the UE 704 transmits, in the combined UL channel, both UCI (e.g., the HARQ ACK 1027) to be carried in the first UL channel and UCI (e.g., the periodic UCI 1029) to be carried in the second UL channel. Alternatively, at operation 1214, the UE 704 transmits one of the first UL channel and the second UL channel.

Figure 13:
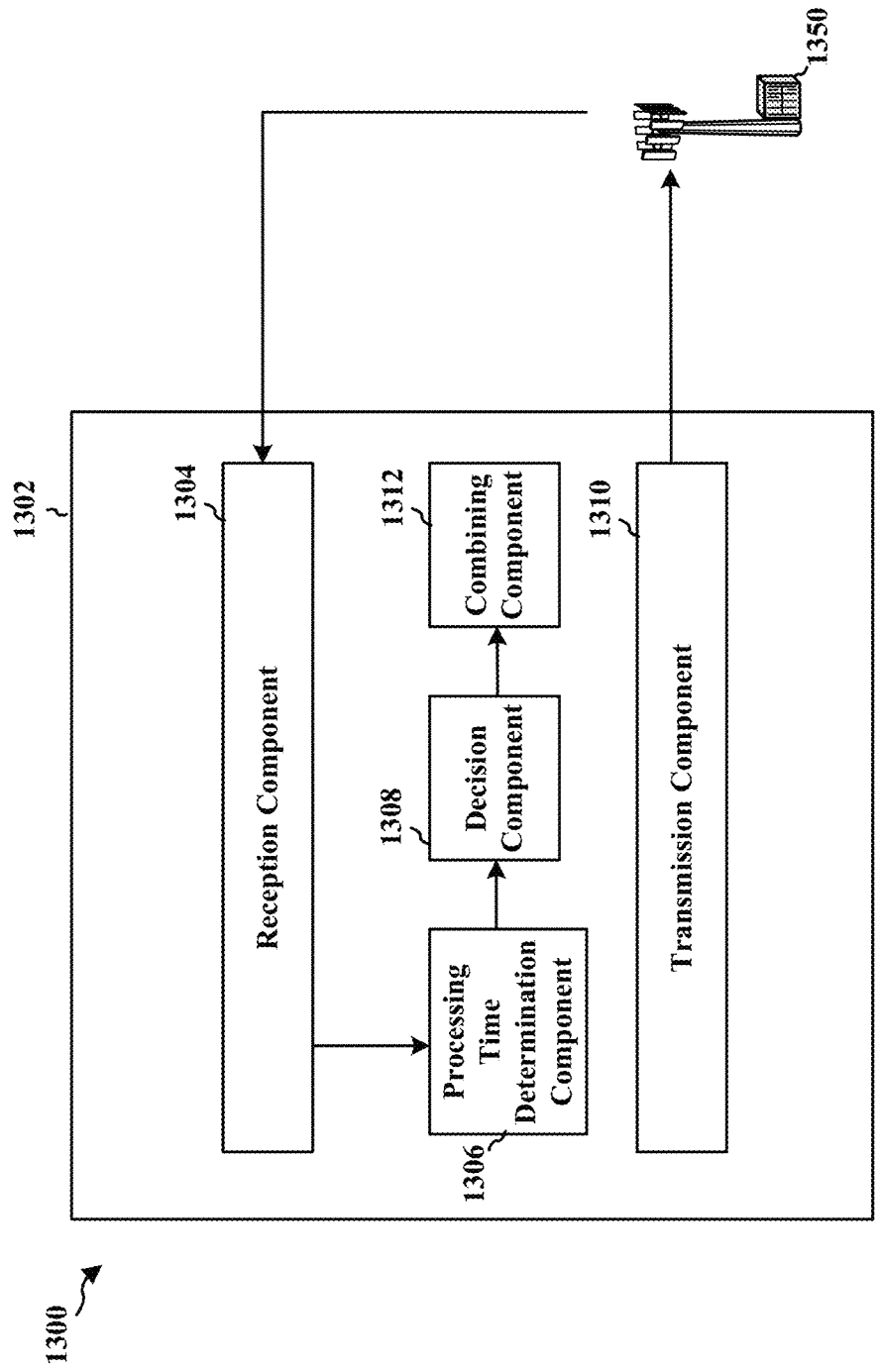
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, a processing time determination component 1306, a decision component 1308, a combining component 1312, and a transmission component 1310.

The reception component 1304 receives DCI (e.g., the DCI 1023) in a downlink control channel (DCCH) (e.g., the PDCCH 1022), the DCI indicating a first uplink (UL) channel (e.g., the dynamic PUCCH 1026).

The decision component determines a second UL channel (e.g., the semi-static PUCCH 1028) that has been scheduled prior to receiving the DCI. In some configurations, the scheduling of the second UL channel is semi-static or semi-persistent. In some configurations, each of the first UL channel and the second UL channel is a PUCCH or a PUSCH. In some configurations, the first UL channel is a PUCCH (e.g., the dynamic PUCCH 1026), wherein the second UL channel is another PUCCH (e.g., the semi-static PUCCH 1028). In some configurations, the first UL channel is for carrying a HARQ ACK (e.g., the HARQ ACK 1027). In some configurations, the second UL channel is for carrying a CSI report (e.g., the periodic CSI reporting 929) or a scheduling request (SR) (e.g., the scheduling request 829). In some configurations, at least one symbol period (e.g., the symbol period 1019) is in one of the first UL channel and the second UL channel and is not in the other one of the first UL channel and the second UL channel.

The decision component 1308 determines that the first UL channel overlaps with the second UL channel in a time domain (e.g., the time domain 1012).

The processing time determination component 1306 determines a predetermined time period (e.g., (N2)×$T_{symbol}$) based on a processing time defined for the UE to decode a DCCH and to prepare a Physical Uplink Shared Channel (PUSCH). In some configurations, the predetermined time period (e.g., (N2+d)$T_{symbol}$) is the processing time and a fixed number of additional symbol periods.

The decision component 1308 determines whether an earliest symbol period (e.g., the symbol period 1019) from the first UL channel and the second UL channel is within a predetermined time period (e.g., (N2+d)$T_{symbol}$) from a last symbol period of the DCCH.

When the earliest symbol period is within the predetermined time period, the decision component 1308 determines that an unexpected event has occurred or the transmission component 1310 transmits one of the first UL channel and the second UL channel.

Alternatively, the transmission component 1310 transmits one of the first UL channel and the second UL channel that contains the earliest symbol period (e.g., the symbol period 1019), when an initial symbol period (e.g., the symbol period 1017) of the first UL channel and an initial symbol period (e.g., the symbol period 1019) of the second UL channel are not the same symbol period.

Alternatively, the transmission component 1310 transmits one of the first UL channel and the second UL channel that has a higher priority level (e.g., the priority 1031 or the priority 1032) than the other in accordance with a predetermined rule, when an initial symbol period (e.g., the symbol period 1017) of the first UL channel and an initial symbol period (e.g., the symbol period 1017) of the second UL channel are the same symbol period.

In some configurations, the predetermined rule defines (a) that a UL channel carrying a HARQ ACK (e.g., the HARQ ACK 1027) has a priority level (e.g., the priority 1031) higher than that (e.g., the priority 832) of a UL channel carrying a scheduling request (e.g., the scheduling request 829) and (b) that a UL channel carrying a scheduling request (e.g., the scheduling request 829) has a priority level (e.g., the priority 832) higher than that (e.g., the priority 932) of a UL channel carrying channel state information (CSI) (e.g., the periodic CSI reporting 929). In some configurations, one of the first UL channel and the second UL channel that has a higher priority than the other in accordance with a predetermined rule is transmitted, when the earliest symbol period is within the predetermined time period. The predetermined rule defines (a) that a UL channel carrying a HARQ ACK has a priority level higher than that of a UL channel carrying a scheduling request (SR) and (b) that a UL channel carrying a SR has a priority level higher than that of a UL channel carrying channel state information (CSI).

On the other hand, when the earliest symbol period is not within the predetermined time period, the combining component 1312 combines the first UL channel (e.g., the dynamic PUCCH 1026) and the second UL channel (e.g., the semi-static PUCCH 1028) to obtain a combined UL channel.

The transmission component 1310 transmits, in the combined UL channel, both UCI (e.g., the HARQ ACK 1027) to be carried in the first UL channel and UCI (e.g., the periodic UCI 1029) to be carried in the second UL channel.

Alternatively, the transmission component 1310 transmits one of the first UL channel and the second UL channel.

Figure 14:
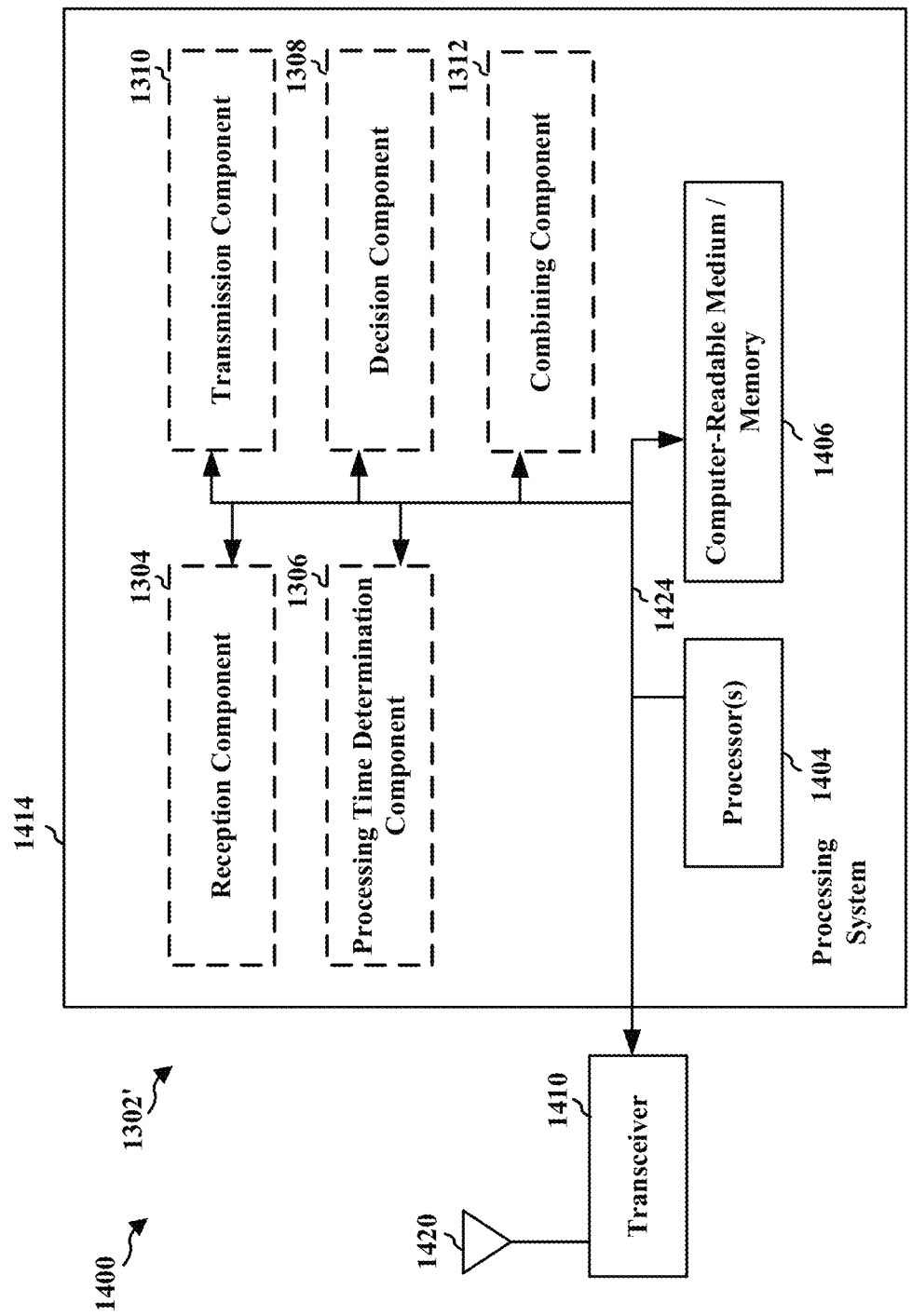
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be a UE. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, the reception component 1304, the processing time determination component 1306, the decision component 1308, the transmission component 1310, the combining component 1312, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 254. The transceiver 1410 is coupled to one or more antennas 1420, which may be the communication antennas 252.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1304, the processing time determination component 1306, the decision component 1308, the transmission component 1310, and the combining component 1312. The components may be software components running in the one or more processors 1404, resident/stored in the computer readable medium/memory 1406, one or more hardware components coupled to the one or more processors 1404, or some combination thereof. The processing system 1414 may be a component of the UE 250 and may include the memory 260 and/or at least one of the TX processor 268, the RX processor 256, and the communication processor 259.

In one configuration, the apparatus 1302/apparatus 1302' for wireless communication includes means for performing each of the operations of FIGS. 11-12. The aforementioned means may be one or more of the aforementioned components of the apparatus 1302 and/or the processing system 1414 of the apparatus 1302' configured to perform the functions recited by the aforementioned means.

As described supra, the processing system 1414 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving downlink control information (DCI) in a downlink control channel (DCCH), the DCI indicating a first uplink (UL) channel;
   determining a second UL channel that has been scheduled prior to receiving the DCI;
   determining that the first UL channel overlaps with the second UL channel in a time domain;
   determining whether an earliest symbol period from the first UL channel and the second UL channel is within a predetermined time period from a last symbol period of the DCCH; and
   determining that an unexpected event has occurred or transmitting one of the first UL channel and the second UL channel, when the earliest symbol period is within the predetermined time period.

2. The method of claim 1, wherein the scheduling of the second UL channel is semi-static or semi-persistent.

3. The method of claim 1, wherein each of the first UL channel and the second UL channel is a physical uplink control channel (PUCCH) or a physical uplink shared channel (PUSCH).

4. The method of claim 3, wherein the first UL channel is a PUCCH, wherein the second UL channel is another PUCCH.

5. The method of claim 4, further comprising:
   combining the first UL channel and the second UL channel to obtain a combined UL channel, when the earliest symbol period is not within the predetermined time period.

6. The method of claim 5, further comprising:
   transmitting, in the combined UL channel, both uplink control information (UCI) to be carried in the first UL channel and UCI to be carried in the second UL channel.

7. The method of claim 4, further comprising:
   transmitting one of the first UL channel and the second UL channel, when the earliest symbol period is not within the predetermined time period.

8. The method of claim 1, wherein the first UL channel is for carrying a hybrid automatic repeat request (HARD) acknowledgment.

9. The method of claim 1, wherein the second UL channel is for carrying a channel state information (CSI) report or a scheduling request (SR).

10. The method of claim 1, wherein at least one symbol period (a) is in one of the first UL channel and the second UL channel and (b) is not in the other one of the first UL channel and the second UL channel.

11. The method of claim 1, further comprising determining the predetermined time period based on a processing time defined for the UE to decode a DCCH and to prepare a Physical Uplink Shared Channel (PUSCH).

12. The method of claim 11, wherein the predetermined time period is the processing time and a fixed number of additional symbol periods.

13. The method of claim 1, further comprising: transmitting one of the first UL channel and the second UL channel that contains the earliest symbol period, when (a) the earliest symbol period is within the predetermined time period and (b) an initial symbol period of the first UL channel and an initial symbol period of the second UL channel are not the same symbol period.

14. The method of claim 1, further comprising: transmitting one of the first UL channel and the second UL channel that has a higher priority level than the other in accordance with a predetermined rule, when (a) the earliest symbol period is within the predetermined time period and (b) an initial symbol period of the first UL channel and an initial symbol period of the second UL channel are the same symbol period.

15. The method of claim 14, wherein the predetermined rule defines (a) that a UL channel carrying a hybrid automatic repeat request (HARQ) acknowledgment has a priority level higher than that of a UL channel carrying a scheduling request (SR) and (b) that a UL channel carrying a SR has a priority level higher than that of a UL channel carrying channel state information (CSI).

16. The method of claim 1, wherein one of the first UL channel and the second UL channel that has a higher priority than the other in accordance with a predetermined rule is transmitted, when the earliest symbol period is within the predetermined time period.

17. The method of claim 16, wherein the predetermined rule defines (a) that a UL channel carrying a hybrid automatic repeat request (HARQ) acknowledgment has a priority level higher than that of a UL channel carrying a scheduling request (SR) and (b) that a UL channel carrying a SR has a priority level higher than that of a UL channel carrying channel state information (CSI).

18. An apparatus for wireless communication, the apparatus being a user equipment (UE), comprising:
  a memory; and
  at least one processor coupled to the memory and configured to:
    receive downlink control information (DCI) in a downlink control channel (DCCH), the DCI indicating a first uplink (UL) channel;
    determine a second UL channel that has been scheduled prior to receiving the DCI;
    determine that the first UL channel overlaps with the second UL channel in a time domain;
    determine whether an earliest symbol period from the first UL channel and the second UL channel is within a predetermined time period from a last symbol period of the DCCH; and
    determine that an unexpected event has occurred or transmitting one of the first UL channel and the second UL channel, when the earliest symbol period is within the predetermined time period.

19. An apparatus of claim 18, wherein the at least one processor is further configured to:
  combine the first UL channel and the second UL channel to obtain a combined UL channel, when the earliest symbol period is not within the predetermined time period.

20. A non-transitory computer-readable medium storing computer executable code for wireless communication of wireless equipment, comprising code to:
  receive downlink control information (DCI) in a downlink control channel (DCCH), the DCI indicating a first uplink (UL) channel;
  determine a second UL channel that has been scheduled prior to receiving the DCI;
  determine that the first UL channel overlaps with the second UL channel in a time domain;
  determine whether an earliest symbol period from the first UL channel and the second UL channel is within a predetermined time period from a last symbol period of the DCCH; and
  determine that an unexpected event has occurred or transmitting one of the first UL channel and the second UL channel, when the earliest symbol period is within the predetermined time period.

* * * * *